United States Patent [19]
Clausen

[11] Patent Number: 6,097,539
[45] Date of Patent: Aug. 1, 2000

[54] REAR PROJECTION SCREEN ASSEMBLY HAVING TRIANGULAR LIGHT DISPERSING ELEMENTS

[75] Inventor: Erik Clausen, Gentofte, Denmark

[73] Assignee: Scan Vision Screen APS, Roskilde, Denmark

[21] Appl. No.: 09/142,938
[22] PCT Filed: Mar. 17, 1997
[86] PCT No.: PCT/DK97/00114
  § 371 Date: Dec. 9, 1998
  § 102(e) Date: Dec. 9, 1998
[87] PCT Pub. No.: WO97/35228
  PCT Pub. Date: Sep. 25, 1997

Related U.S. Application Data

[60] Provisional application No. 06/029,801, Oct. 31, 1996.

[30] Foreign Application Priority Data

Mar. 18, 1996 [DK] Denmark .................................. 0308/96

[51] Int. Cl.$^7$ .................................................. G03B 21/60
[52] U.S. Cl. .......................................................... 359/456
[58] Field of Search .................................... 359/455, 456, 359/619, 453, 460, 457, 454, 452; 353/31, 32, 79

[56] References Cited

U.S. PATENT DOCUMENTS

| | | | |
|---|---|---|---|
| 3,578,841 | 5/1971 | Elmer | 350/127 |
| 4,418,986 | 12/1983 | Yata et al. | 350/128 |
| 4,468,092 | 8/1984 | Inoue et al. | 350/128 |
| 4,509,822 | 4/1985 | Clausen et al. | 350/128 |
| 4,561,720 | 12/1985 | Clausen et al. | 350/128 |
| 4,927,233 | 5/1990 | Nakanishi et al. | 350/128 |
| 4,941,732 | 7/1990 | Umeda et al. | 350/128 |
| 5,005,945 | 4/1991 | Van de Ven | 350/128 |
| 5,076,661 | 12/1991 | Bradley | 359/456 |

*Primary Examiner*—Safet Metjahic
*Assistant Examiner*—Christopher E. Mahoney
*Attorney, Agent, or Firm*—Finnegan, Henderson, Farabow, Garrett & Dunner, L.L.P.

[57] ABSTRACT

A rear projection screen assembly including a screen that is illuminated from behind by at least two image sources, and that has a front side having light dispersing elements for reception of light beams from the image sources in order to display an image with a mainly homogeneous luminosity over a wide viewing angle. The light dispersing elements are defined by a number of closely positioned, substantially parallel, vertically running lens elements, where the lens elements include a number of triangular lenses arranged in pairs of two, each triangular lens having two side faces and a symmetry plane. The symmetry planes of the two triangular lenses for each pair are symmetrically inclined with respect to each other and to a normal of the plane of the projection screen. The side faces of each triangular lens are further inclined in such a way that they are totally reflective of light transmitted from each of the at least two image projecting devices, and such that the totally reflected light radiates from the other side face of the respective triangular lens.

11 Claims, 7 Drawing Sheets

— HORIZONTAL
- - - - VERTICAL

REAR PROJECTION SCREEN ASSEMBLY HAVING TRIANGULAR LIGHT DISPERSING ELEMENTS

The present application is entitled to priority under 35 U.S.C. § 119(e)(1) based on U.S. provisional application Ser. No. 06/029,801, filed on Oct. 31, 1996.

The invention relates to a rear projection screen of the kind that is illuminated from behind and that has at the front side light dispersing mediums for reception of light beams from a image source with a view to showing a image with mainly homogeneous luminosity over a wide viewing angle. The light dispersing elements consist of a number of tightly positioned, substantially parallel and in the application position of the screen vertically running lens elements, that have two triangular lenses, an intermediate cylinder lens and a lens adjacent to the triangular lenses.

Such projection screens are applied in various devices for producing a visible image to the viewer, e.g. projection of radar images, aeroplane simulators, television, traffic control lights, microfilm readers, video games, video monitors with projected image and for projection of movies through rear projection. In such devices a light source, placed behind the screen, projects light forward along a projection axis against the screen in preparation for generating, at the level of the screen, an image which is spread to all viewers in front of the screen.

When a large number of viewers are present they will normally spread horizontally, and thus it is desirable to have a broad dispersion of the light horizontally over a wide angle. This is especially the case with television sets with a rear projected screen, where there a large number of viewers sitting in front of the screen at the horizontal level over a relatively wide angle relative to the screen.

One of the problems you have to cope with, in connection with rear projection systems, is that most of the light is projected along the projection axis, which means that the intensity of the image increases, the closer the viewer sits to the projection axis. Colour video devices with rear projection screens normally apply three cathode ray tubes, that is to say one tube for each of the primary colours, i.e. red, green, and blue, which tubes project the image to the screen through their own projection lens. In a conventional horizontal arrangement of the cathode ray tubes the green tube is normally positioned centrally on the projection axis, while the red and the blue cathode ray tube are placed with their optical axes at an angle of 5 to 10 degrees with the projection axis of the green tube. Unless the screen compensates for these displaced positionings, a phenomenon called colour shifting will occur. This phenomenon expresses itself through the fact that, if the luminosities of the three colours is normalized at the center of the viewer group, the luminosity relationship varies with the angular position in the horizontal plane all over the viewing angle. This implies that a viewer's perception of the image depends on his place in the horizontal plane in front of the screen.

Add to this that, when rear projected projection screens are used in and exposed to ambient light, the contrast of the projected image is affected by the light reflection on the front side of the screen. Thus, it is desirable to reduce the reflection of ambient light from the front side of the screen. For reduction of the light reflection various masking technologies have been suggested, where a black, non-reflective sheet has been inserted between the lenses, or all the front of the screen without black stripes has been mattered.

Various rear projected screens have been suggested for the purpose of increasing the viewing angle in the horizontal plane. U.S. Pat. Nos. 4,418,986 and 4,509,822 describe such a system, where a screen is applied which has a rear sheet like a Fresnel lens, which is able to collimate the beams from the image source in parallel beams, and a front sheet, which is constructed with a dispersion lens with vertical continuous ribs/vertices for spreading the light over a specified horizontal viewing angle. According to the well-known technique, the front side of the screen is substantially divided into two lens types, a cylindrical lens for dispersal of the light for a narrow forward directed visual field and a total reflecting lens for further increasing the viewing angle.

Among experts it is well-known that it is technically difficult to achieve a homogeneous light dispersion when using the well-known lens constructions because the well-known systems are constructed with one or two lenses—one lens that transmits the light within a narrow horizontal viewing area, e.g. ±25°, and a lens with inner totalreflection that spreads the light from ±25–30° up to ±60°, respectively. It applies to both lens types that it is technically difficult to achieve sufficient overlapping between the two lens types, and especially when the rear projection screen is used for video projection, where normally three projection cathode ray tubes are applied—one cathode tube for each fundamental colour, and where the optical axis of those normally have a mutual angel of 7–12°.

If e.g. the green image is projected at right angles on the rear side of the screen, the blue and the red image shall be projected against the rear side of the screen with an inclination of e.g. the mentioned 7° relative to the normal of the screen. This may, however, effect that a person watching the screen diagonally from the front will see an image that is either blue or red dominated—i.e. according to whether the person in question is closest to the optical axis of the projector emitting the blue image or to the projector emitting the red image. This colour distortion will in the following be named "colour-shading".

The rear projection screen according to the present invention is characteristic in that five lenses are applied. Three of them transmit the light coming from behind, and the two others have mutually different inclinations compared with the normal for the screens. Besides they are total-reflective towards light coming from behind, and in that this light which is totally reflected radiates from the side parts of the lenses in a broad fan.

Thus, light coming from behind will be one hundred percent reflected when it hits the inner side of two symmetric triangular lenses, since the precondition for the total reflection is present. A light beam that hits the inner side of the left lens part in this way will be radiated through the right side part of the lens with a radiation direction that is different from the nearest situated triangular lens. In this way, through the asymmetric construction of the lenses, you will achieve having the light spread across a wider fan. Through this you will also see that the colour shading explained above will be neutralized caused by the fact that the total reflected light that is radiated through the reflecting lenses will be spread in an arc of an angle that is approx. 10–30% bigger than the angle which the optic axis of the light source form with each other.

An observer viewing the image diagonally from in front, will in this way see three merged images since the asymmetric lenses will deflect the light in such a way that beams from the three light sources will be perceived as being approximately parallel. At the same time you will achieve the advantage that is connected to lenses with one hundred percent reflecting sides: the image can be viewed under a wide side-viewing angle. In order to ensure that also the intermediate lenses, where the forward directed light is radiated through the vertices are blended in such a way that the colour shading problem is neutralized, the lenses are made with different curvatures. This means that the relation between the volume of light that is radiated through the asymmetric lens vertices and the intermediate and outer lenses may vary within wide limits according to the severity of the colour shading problem in the particular appliance.

BRIEF DESCRIPTION OF THE DRAWINGS

The invention will be explained further with reference to drawings, where

Prior to describing the embodiments of the present invention, the general design of a projection system applying rear projection screens according to the invention with particular reference to FIGS. 1 and 2 will be explained. FIG. 1 shows as an example of a sectional view of a projection TV-set. The video projection device 1 is often constructed with three image tubes 2, a lens 4, a mechanical coupling 3, a mirror 5 as well as a rear projection screen 6.

FIG. 2 shows a rear projection screen with three light sources, that have a surface provided with lenses for projection and application of projection screens of the kind discussed herein. The three projectors 7, 8 and 9 project TV-images against the rear side of a projection screen 23. Each projector supplies green, red and blue light, respectively. The three projectors are horizontally placed side by side in such a way that projector 8, which is often the green projector, has its optical axis perpendicular to the screen 23. The projectors 7 and 9's optic axis 13 and 15 often form an angle of 8–12 degrees relative to projector 8.

Figure 1:
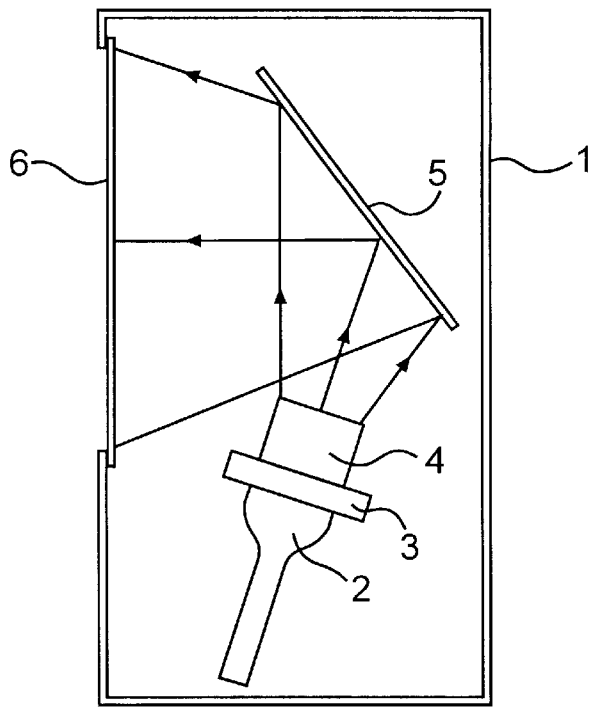
FIG. 1 shows a sectional view of a video device.
Figure 2:
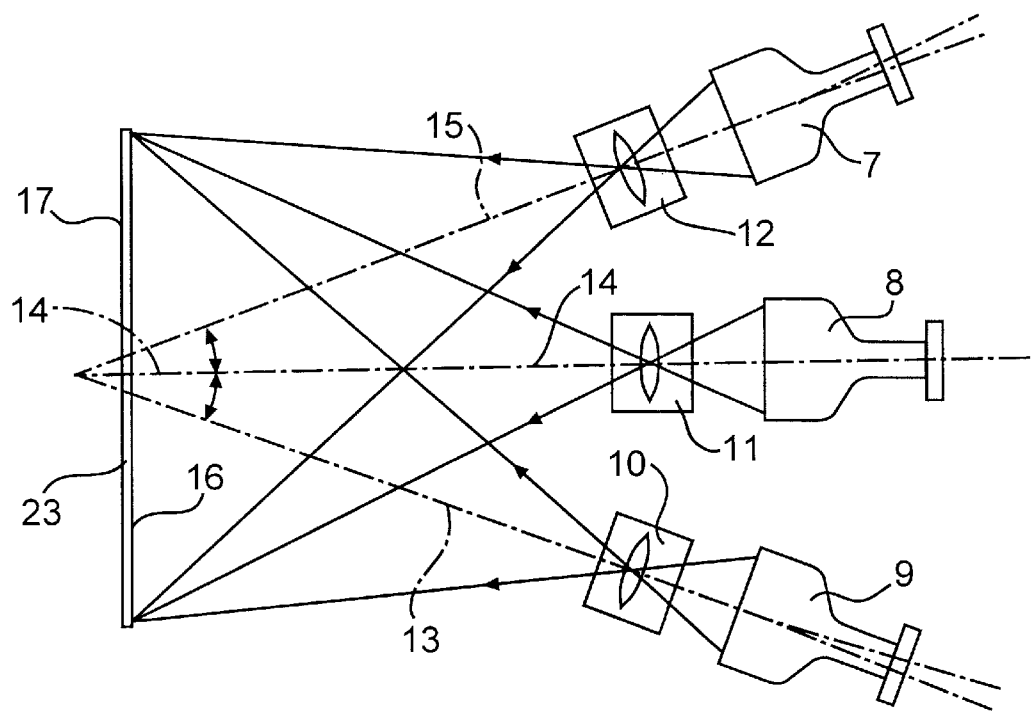
FIG. 2 shows a colour projection TV-system comprising a projection screen and three cathode ray tubes with associated lenses.

By means of the three projectors 1, 8 and 9 as well as the lenses mounted in front 10, 11, and 12 it is possible to form an image which is enlarged relative to the projectors, on the screen 23. Very often a projection screen 23 has lens structure at the rear 16 and at the front 17. The rear side 16 is often designed as a Fresnel lens that converts the divergent light beams into parallel light beams. The light beams that are parallel transmitted through the rear-projection screen 23 are medium dispersed from the front surface of a lens structure 17 into a suitable viewing angle.

In the following the preferred embodiments of the invention will be described with reference to the drawing.

Figure 3:
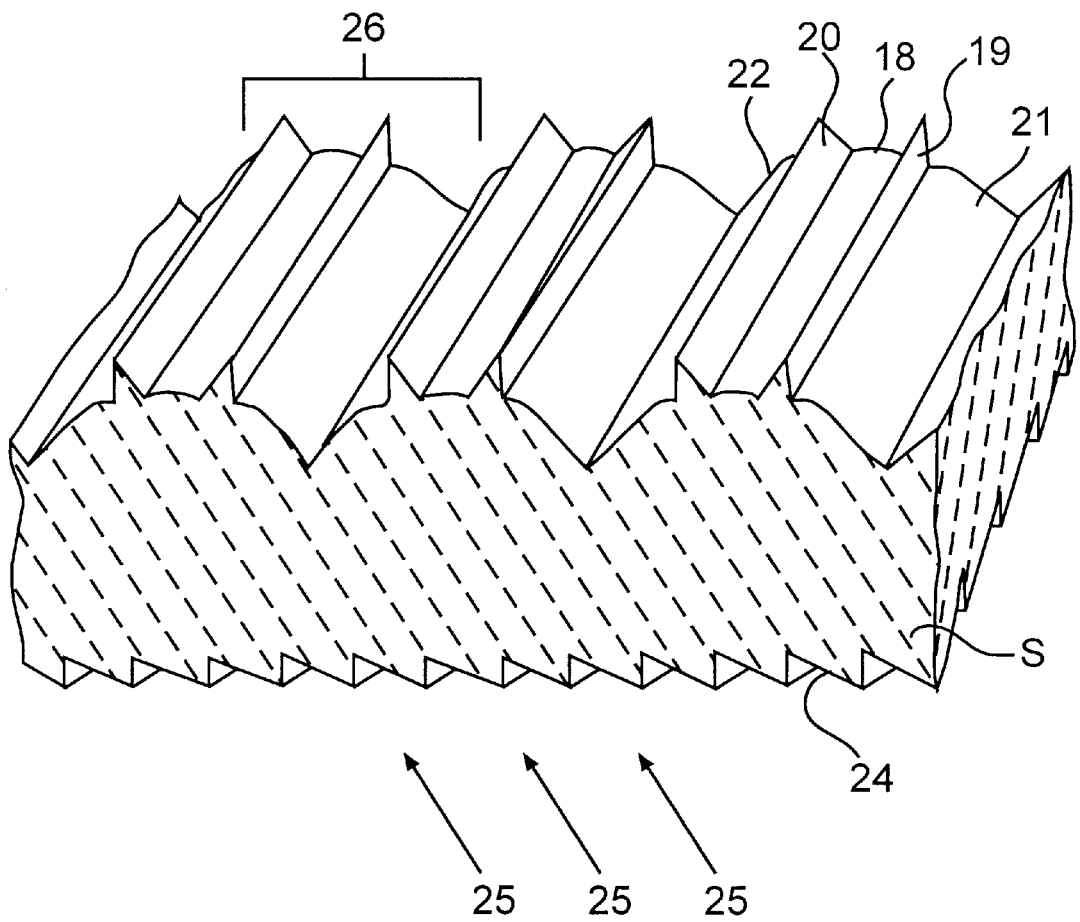
FIG. 3 shows a perspective section of the screen according to the present invention.

FIG. 3 represents perspective images of rear projection screens according to the invention. As it appears from this figure, the rear projection screen has, according to the invention, at the surface of the image side, a surface 26 provided with lenses running vertically to the application position of the screen. In the figures, 18 denotes a cylinder lens. The lateral edges of this lens border on the two asymmetric total reflecting lenses 19, 20 that adjoin in turn on their respective transmitting lens 21, 22.

The rear side 24 shows a section of a Fresnel lens structure for parallelizing the light coming from the light source 25.

Figure 4:
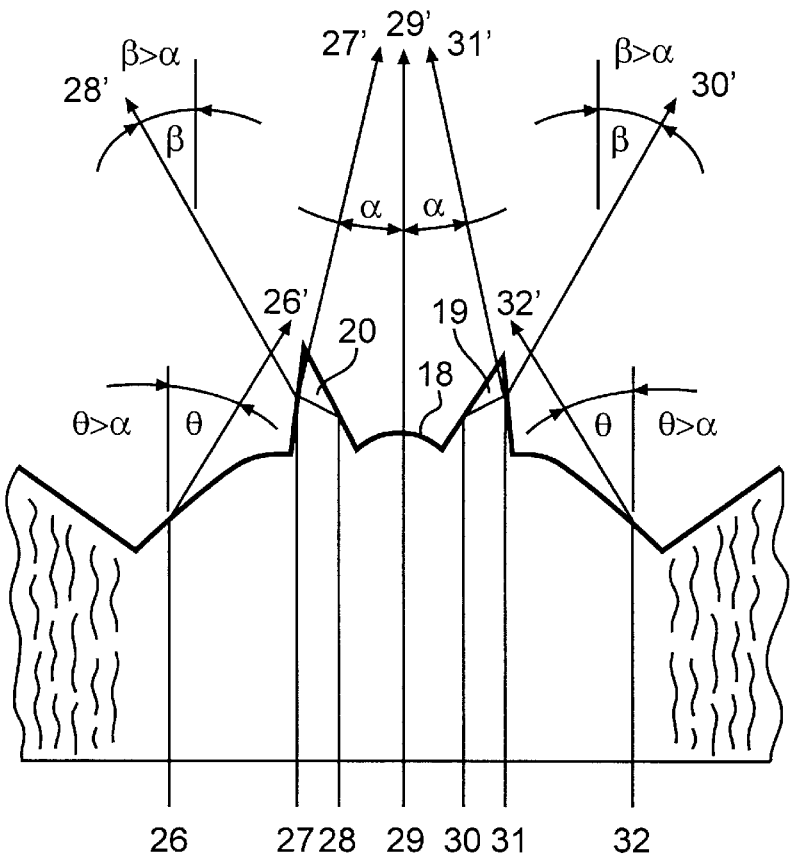
FIG. 4 show a section through the drawing shown in FIG. 3 according to the present invention for illustration of the path of beams.

FIG. 4 shows a section of FIG. 3 according to the present invention for illustration of the beam path. For clarity reasons only the beam path of the green light is shown. As it appears from the figure, a light beam 29 from the green light source will pass through the center of screen lens 18 without deflection. At the arc shaped part of lens 18 the light will be bent within a small visual field e.g. ±15°. The cylinder lens 18 adjoins on the two asymmetric total reflecting lenses 19 and 20. The present invention differs substantially from the well-known techniques in that the total reflecting triangular lenses 19 and 20 are constructed in such a way that their axes of symmetry are not parallel. In this way it is possible to disperse the light over a wide visual field, which also appears from the light beams 27, 27' and 28, 28', and 30 and 30', and 31 and 31' and through this the colour shading problem already mentioned is eliminated.

Figure 4A:
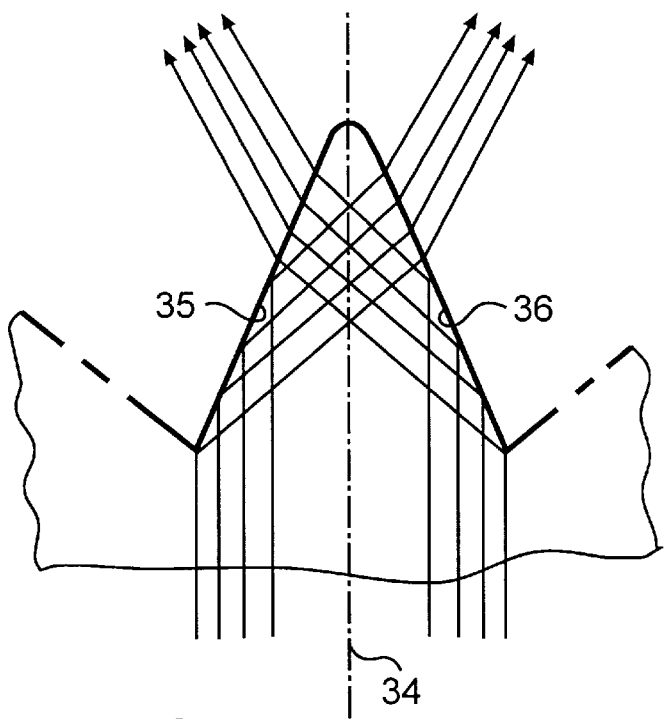
FIGS. 4A/4B show the path of beams of a well-known construction.

According to FIG. 4A an example is shown of a total reflecting lens of the well known technique. The symmetry axis 34 of that type of lenses is always normal to the surface of the screen. For clarity reasons only the light beams from the green light source are shown. As it appears from the drawing, the light beams that are totally reflected by the inner sides of the lenses 35 and 36 will radiate parallelly through the opposite side of the lens in one and only one specific direction. A spectator will then only be able to see the sidelight from the screen on condition that he sits in a certain place.

Figure 4B:
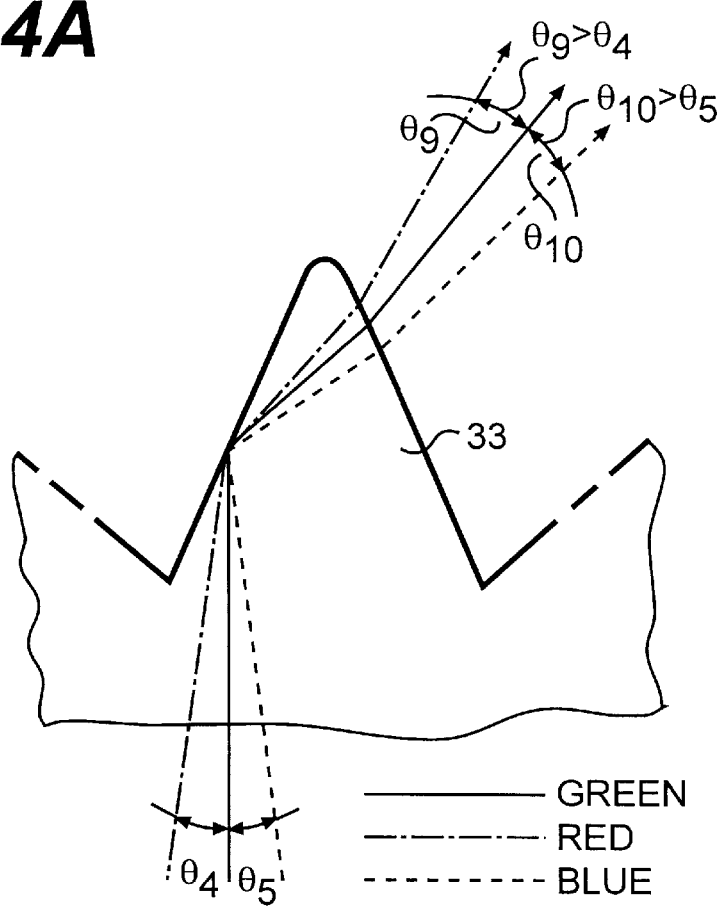

FIG. 4B shows the beam path for all three light sources of the well-known technique. As it appears from the drawing, the colour shading problem will grow even bigger by using the well-known technique since the angle between the optic axis θ4 and θ5 will grow to θ9 and θ10 when the light beams have passed lens 33. A spectator viewing the screen diagonally from the side will then see a splitting up of the three primary colours, from each their light source.

Figure 5:
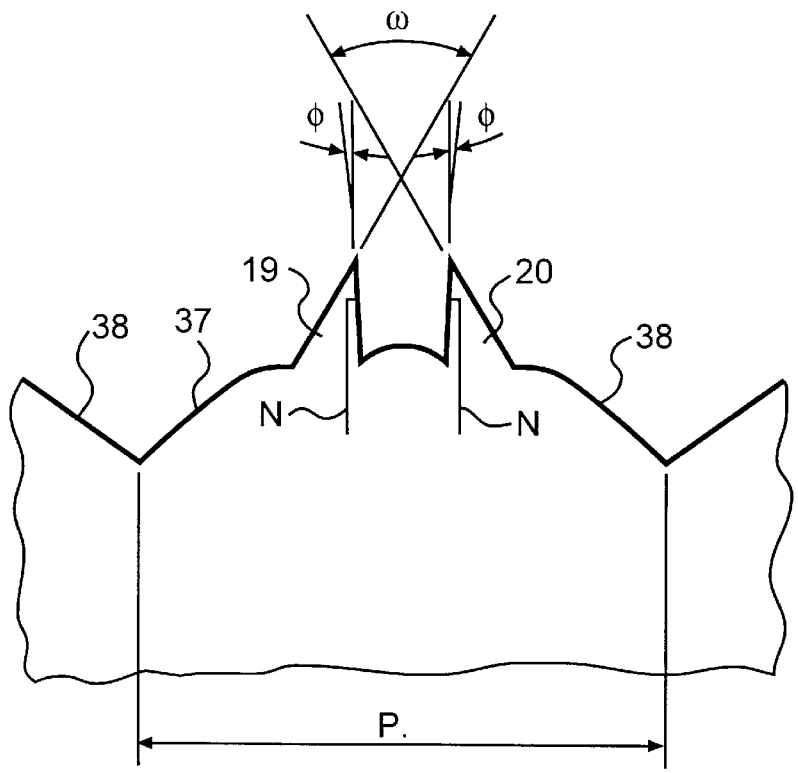
FIG. 5 shows a section of the present invention, where the triangular lenses have been laterally transposed according to FIG. 4.

FIG. 5 shows an alternative embodiment of the present invention. In this example the lenses 19 and 20 have been reversed such that the steep sides of the lenses face each other. The angles of those lens sides are indicated relative to the normal of the screen N. The angle between the outer legs of the lenses is X. Basically the mode of operation of this lens does not deviate from the one mentioned in FIG. 4.

Figure 6:
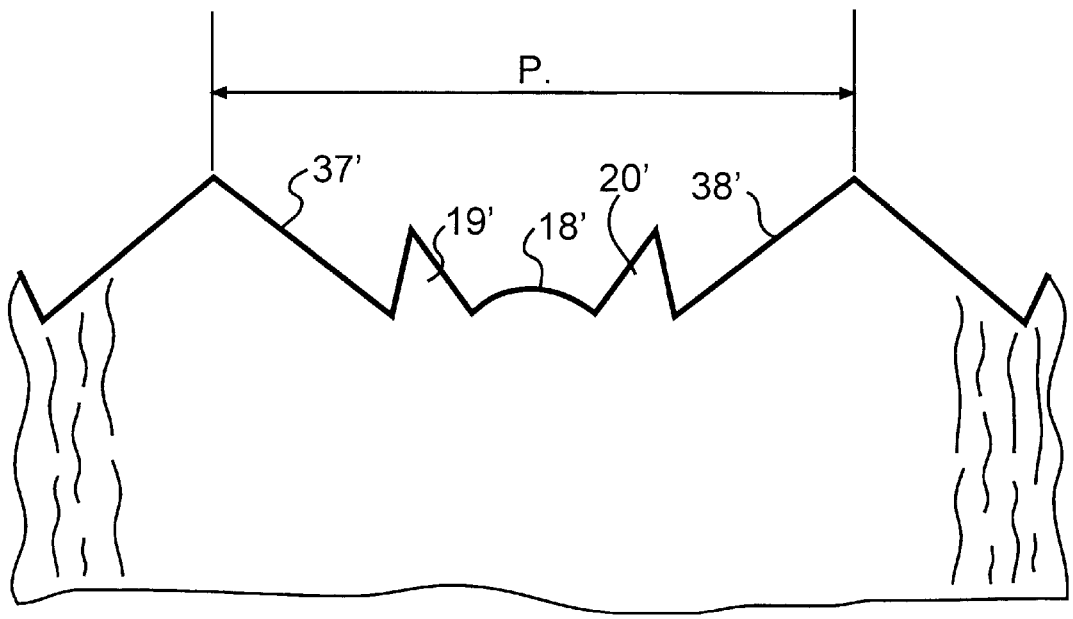
FIG. 6 shows an alternative embodiment of the present invention.

FIG. 6 shows even another embodiment of the present invention, where the lenses 37' and 38' have been laterally reversed around an axis parallel with the plane of the screen. The mode of operation of this construction does not deviate from the modes mentioned earlier regarding the present invention.

Figure 7:
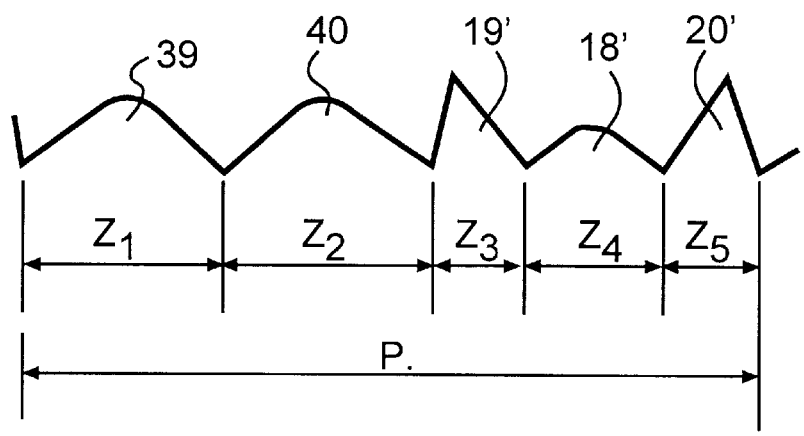
FIG. 7 shows a further embodiment for illuminating a screen according to the present invention.

FIG. 7 shows another example of the well-known invention. The drawing deviates substantially from FIG. 6 in the way that the lenses 37 and 38 have been split up with a minor dividing distance. In this way the mode of operation of the lenses 39 and 40 corresponds to the lenses 37' and 38'.

In FIGS. 4, 5, 6, and 7 different embodiments of the screen according to the present invention are showed especially as regards the additional lenses. Lenses that adjoin the asymmetric lenses 19 and 20 may have a convex or a concave shaping or a mixture of those lens types.

Figure 8:
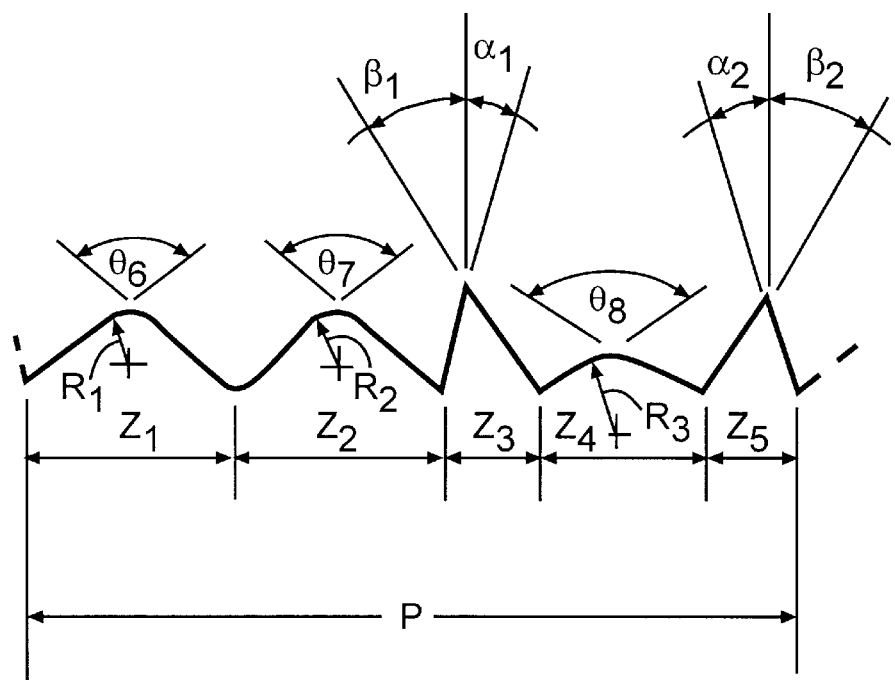
FIG. 8 shows a section of the present invention with reference measures and angles for the examples mentioned in the description.
Figure 11:
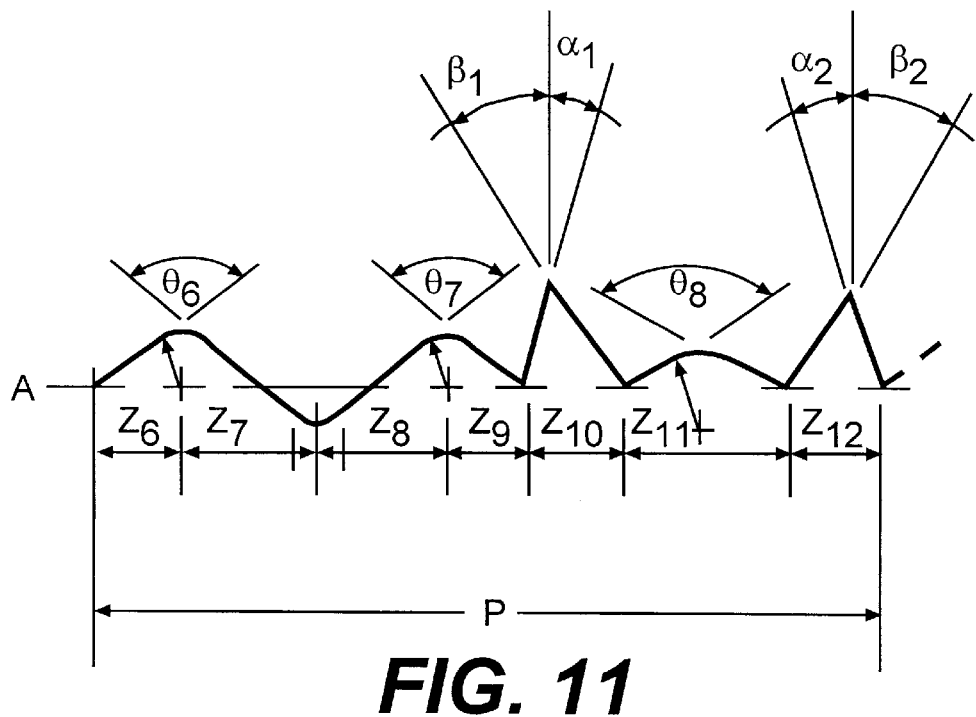
FIG. 11 shows another embodiment of the present invention.

FIG. 8 shows a figure with reference measurements and angles of the examples mentioned in the description.

Figure 9:
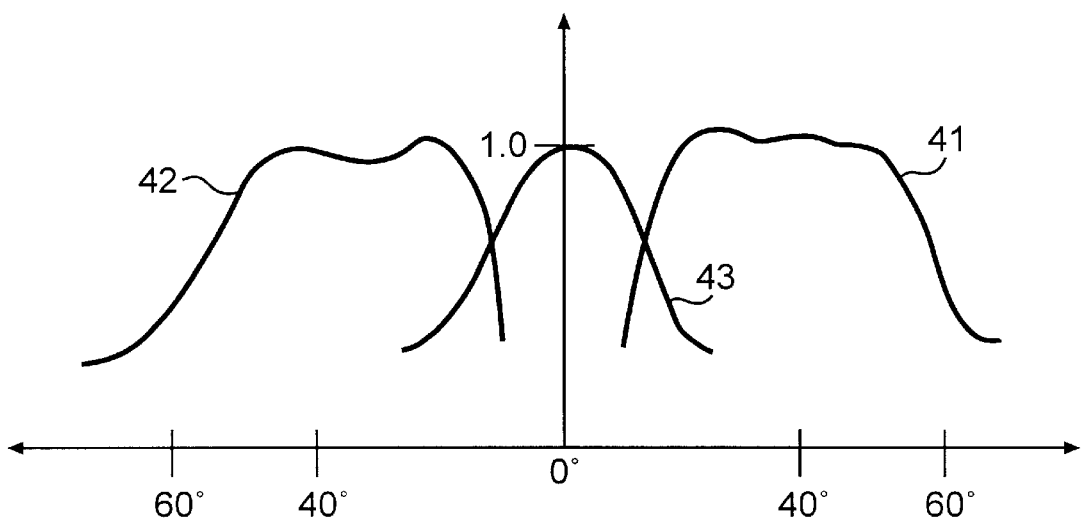
FIG. 9 shows light transmission curves for the total reflecting lenses and for the transmitting lenses, respectively, as a function of the viewing angle according to the present invention.

On FIG. 9 relative measurement results for the right lens 19 curve 41 and the left lens 20 curve 42 are shown. The bell-shaped curve 43 in the middle is the total measurement result of the lenses 40, 39 and 18 of FIG. 7.

Figure 10:
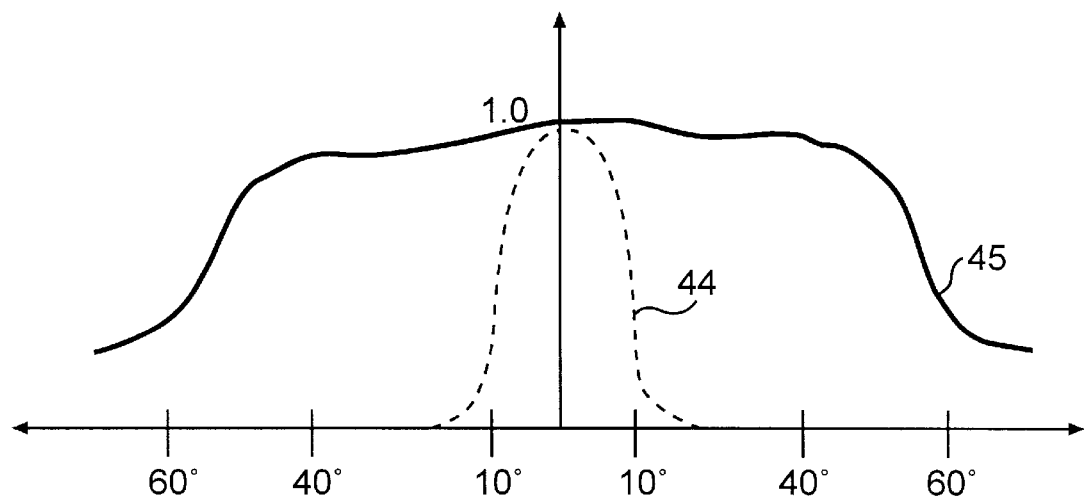
FIG. 10 shows optical measurement results of a test according to the present invention.

FIG. 10 shows all lenses in function for respectively horizontally and vertically measuring according to the figure shown in FIG. 7. From the figure it appears that according to the invention the screen showed a very constant light at the horizontal level within a viewing angle of ±50°. In order also to achieve a certain vertical light dispersion, light refractive particles can be added to the screen without changing the other properties of same. The quantity of such light scattering particles should be a maximum of 45 g/m$^3$, when those particles have an optical refraction index within the area 1.5–1.58 and a grain size from 3 $\mu$m to 65 $\mu$m.

The bell-shaped curve 44 of FIG. 10 is only obtained when adding a glass powder. It has to be noted that normally the viewers are positioned in the horizontal plane, and thus the constructor endeavours to achieve the widest viewing angle at that level.

EXAMPLE 1

With a casting mould of the profile shown in FIG. 7, a 2 mm sheet of PMMA (Acrylic) added 21 g SiO2 per m$^2$ with a particle size of 3–28 $\mu$m was cast. The dividing distance P indicates the repeat frequency of a lens set and was: 0.80 mm. The width of the lens 40 was: $Z_1$–$Z_2$=0.2 mm, $Z_3$=$Z_5$= 0.10 mm. Cylinder lens 18's width was 0.16 mm. The top angles of lenses 19 and 20 were 20° and 25°, respectively, relative to the normal of the screen. The lenses 40, 39 and 18 had identical top angles of 98° and the radius of curvature was: 0.03 mm. The screen showed the following results:

Peak Gain: 3.8

½ Horizontal Peak Gain: 37°

½ Vertical Peak Gain: 12,4°

The screen exhibited good properties, i.e. the image was visualized within a visual field of ±90°. The term "Peak Gain" is the indication for the quantity of light that is measured perpendicular to the screen at a certain distance.

EXAMPLE 2

A mould with reference to FIG. 8 had the following specifications: P=0.80 mm $Z_1$=$Z_2Z_i$=0.18 mm, Θ6=Θ7=Θ8 103°, curvature radius $R_1$=$R_2$=$R_3$=0.03 mm, $Z_3$=$Z_5$=0.08 mm, $\beta_1$=$\beta_2$ 26°, $\alpha_1$=$\alpha_2$=19°.

The screen was cast of a size 300×350 mm. When pouring into the mould the liquid PMMA (acrylic) 7 g SiO$_2$ of grain size 2–28 $\mu$m was mixed into it with a small quantity of black dye. The mould was horizontally placed, i.e. the SiO$_2$ particles of that certain viscosity had deposited after 1–2 hours at the side of the mould where the lens structure was. Then the mould was heated to approx. 55° for 5 hours, and then it cured for 1½ hour. The mould was slowly cooled for about 2 hours, and then the mould could be separated. The test was repeated in such a way that the particles deposited at the opposite side of the sheet. The measurings that followed showed that the test results from the first and the second tests were almost identical.

The screen showed the following results:

Peak Gain: 3.9

½ Horizontal Peak Gain: 42°

½ Vertical Peak Gain: 9,8°

The screen showed colour purity and a distribution of light approximately as per FIG. 10.

Both tests were repeated, SiO2 was, however, replaced by the following light dispersion agents in CaCo3, BaSo4, as well as fine powdered glass, glassballs or plastic balls with a refractive index which is 0.04–0.08 greater or less than the base material. By way of example PMMA, styrene, a mixture of PMMA and styrene or the like applicable plastics material may be used. Grain size and adding quantity was adjusted. Results: none of the mentioned light diffusion materials produced essential differences from SiO2.

Moreover, in this test the location of the light diffusion material in the screen was changed. I.e. it was laid in a roughly defined layer at the lens side at the centre of the screen, as well as at the side turning towards the projectors and in all the layer thickness. This did not result in significant changes. Besides, by way of experiment, between the Fresnel lens 24 and the lenticular lens screen 26 a diffusion plate was inserted, which did not change the results essentially either.

What is claimed is:

1. A rear projection screen assembly comprising:

an image source comprising a least two spaced image projecting devices for projecting at least two separate images, respectively;

a projection screen defining a plane and having a rear side and a front side, the rear side facing towards the at least two image projecting devices, the front side comprising light dispersing elements for reception and deflection of said at least two separate images to create a combined image with a substantially homogeneous luminosity over a wide viewing angle, wherein the light dispersing elements comprise a plurality of closely situated, substantially parallel, vertically oriented lens elements in an application portion of the screen, the lens elements each including a pair of triangular lenses, each triangular lens of the pair having two side faces and a symmetry plane;

wherein one or more transmitting lenses are arranged between the triangular lenses of each of said pairs and between the triangular lenses of neighboring pairs;

wherein the symmetry planes of the two triangular lenses of each pair are symmetrically inclined with respect to each other and to a normal of the plane of the projection screen, and wherein the two side faces of each triangular lens are inclined to be totally reflective of light transmitted from each of the at least two image projecting devices, and so that light totally reflected by one side face radiates from the other side face of each triangular lens.

2. A rear projection screen assembly according to claim 1, and comprising first, second and third image projecting devices, each of the projecting devices having an optical axis, and wherein the second and third image projecting device have their respective optical axes placed at an angle of between 5° and 10° with respect to the optical axis of the first image device.

3. A rear projection screen assembly according to claim 1, wherein one of the side faces of each of the triangular lenses has an angle ($\alpha 1$, $\alpha 2$) of 5° to 25°, but not 15°, with respect to the normal of the plane of the screen, and the other side face of the triangular lenses has an angle ($\beta 1$, $\beta 2$) of 15°, with respect to the normal of the plane of the projection screen.

4. A rear projection screen assembly according to claim 1, wherein one of the side faces of each of the triangular lenses has an angle ($\alpha 1$, $\alpha 2$) of 18°, with respect to the normal of the plane of the projection screen, and the other side face of the triangular lenses has an angle ($\beta 1$, $\beta 2$) of 28°, with respect to the normal of the plane of the projection screen.

5. A rear projection screen assembly according to claim 1, wherein the projection screen comprises a Fresnel lens at the rear side of the projection screen.

6. A rear projection screen assembly according to claim 5, wherein the projection screen is constructed by a laminating process, and wherein the projection screen includes two parts, a light dispersing part on the front side and a Fresnel part on the rear side.

7. The rear projection screen assembly according to claim 1, wherein the light dispersing elements are made of acrylic (PMMA) or a mixture of acrylic and styrene.

8. A rear projection screen assembly according to claim 1, wherein the front side is slightly frosted.

9. A rear projection screen assembly according to claim 1, wherein the front side is slightly frosted by etching a mold used for molding the projection screen or by a subsequent coating.

10. A rear projection screen assembly according to claim 1, wherein the light dispersing elements in the screen comprise organic pigments, inorganic pigment or a mixture thereof.

11. A rear projection screen according to any of the claims 1 to 10, wherein the screen is divided into two parts facing each other, the part comprising the light dispersing elements on one side thereof further comprising at the other side thereof a plurality of parallel horizontally oriented lenses for dispersion of light in a vertical direction.

* * * * *